(12) United States Patent
Dubbels et al.

(10) Patent No.: US 6,222,634 B1
(45) Date of Patent: Apr. 24, 2001

(54) APPARATUS AND METHOD FOR PRINTING RELATED WEB PAGES

(75) Inventors: Joel C. Dubbels, Eyota; Kevin P. Gibson, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/893,470

(22) Filed: Jul. 11, 1997

(51) Int. Cl.$^7$ .................................................. G06F 15/00
(52) U.S. Cl. .................................... 358/1.15; 358/1.15
(58) Field of Search ............................ 395/107, 116, 395/117, 114, 615, 335, 200, 111, 106; 245/352; 358/1.15, 1.16, 1.17, 1.18, 1.1, 1.14, 1.11, 1.13

(56) References Cited

U.S. PATENT DOCUMENTS

| | | | |
|---|---|---|---|
| 5,625,781 | * 4/1997 | Cline et al. | 395/335 |
| 5,715,453 | * 2/1998 | Stewart | 395/615 |
| 5,854,630 | * 12/1998 | Nielsen | 345/352 |
| 5,950,173 | * 9/1999 | Perkowski | 705/26 |
| 6,026,388 | * 2/2000 | Liddy et al. | 707/1 |
| 6,029,182 | * 2/2000 | Nehab et al. | 707/523 |

FOREIGN PATENT DOCUMENTS

| | | | |
|---|---|---|---|
| 0851367 | 7/1998 | (EP) | G06F/17/30 |
| 2305525 | 4/1997 | (GB) | G06F/17/30 |

OTHER PUBLICATIONS

SlipKnot's New "Get All links" Retrieval Feature (pp. 1–3) in internet, Nov. 1996.*
Seybold Report on Internet Publishing vol. 2, No. 1, Sep. 1997, S Edwards et al., "Roll over, Gutenberg: how the Web is changing printing", pp. 5–20 (see "Canon's WebRecord", and also IAC Accession No. 19756197).

* cited by examiner

Primary Examiner—Joseph Mancuso
Assistant Examiner—Douglas Q. Tran
(74) Attorney, Agent, or Firm—Martin & Associates, L.L.C.; Derek P. Martin

(57) ABSTRACT

An apparatus and method for printing related web pages allows a web user to select a web page, then print all of the related web pages based on a predetermined criteria. In a first embodiment, each web page includes an applet that is run on the web client system when a print button on the page is pressed. The client applet communicates with a print tool running on the server that parses the selected page and builds a list of related pages and allows the user to select which of the related pages will be printed. Once the user selects the pages to be printed, the print tool constructs a temporary web page that contains all the web pages the user selected. This temporary web page may then be printed using the standard print function supplied with the browser. In a second embodiment, a print utility in the web client allows a user to print related web pages by parsing a selected web page and building a list of related pages. The user may then select from a the list of related pages which pages to print. The selected pages are then printed.

36 Claims, 8 Drawing Sheets

APPARATUS AND METHOD FOR PRINTING RELATED WEB PAGES

FIELD OF THE INVENTION

This invention generally relates to computer networks, such as the Internet. More specifically, this invention relates to an apparatus and method for printing web pages.

BACKGROUND OF THE INVENTION

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer systems. A user at an individual PC (i.e., workstation) that wishes to access the Internet typically does so using a software application known as a web browser. A web browser makes a connection via the Internet to other computers known as web servers, and receives information from the web servers that is displayed on the user's workstation. Information displayed to the user is typically organized into pages (known as web pages) that are constructed using a specialized language called Hypertext Markup Language (HTML). Many web pages include one or more special reference locations known as "links" that invoke other web pages. Links allow a web user to easily navigate to other web sites of interest by clicking on the appropriate link with a mouse or other pointing device.

Often a web user will want to print a web page being currently viewed. Web browsers typically have a print function that allows a user to print the current page. However, as the complexity of web sites increases, it becomes increasingly difficult to locate needed information, and the process of printing several related web pages becomes a tedious exercise that involves: invoking the web page, printing the web page, invoking the next web page, printing, invoking, printing, etc. In other words, prior art browsers require a user to invoke a page before printing it. With these prior art browsers, if a user needs to print 40 related web pages, the user must manually invoke and print each of the 40 web pages. Needless to say, this process becomes very time-consuming.

As the number of Internet users, providers, and web servers continues to rapidly expand, it will become increasingly important for a web user to be able to print related web pages without manually invoking and printing each page. Without improvements in the manner web pages are printed, the printing of web pages will continue to be an impediment to the effective usage of resources available on the Internet.

SUMMARY OF THE INVENTION

According to the present invention, an apparatus and method for printing related web pages allows a web user to select a web page, then print all of the related web pages based on a predetermined criteria. In a first embodiment, each web page includes an applet that is run on the web client system when a print button on the page is pressed. The client applet communicates with a print tool running on the server that parses the selected page and builds a list of related pages and allows the user to select which of the related pages will be printed. Once the user selects the pages to be printed, the print tool constructs a temporary web page that contains all the web pages the user selected. This temporary web page may then be printed using the standard print function supplied with the browser. In a second embodiment, a print utility in the web client allows a user to print related web pages by parsing a selected web page and building a list of related pages. The user may then select from the list of related pages which pages to print. The selected pages are then printed.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE PREFERRED EMBODIMENT

OVERVIEW

The method and apparatus of the present invention has particular applicability to printing web pages on the Internet. For those individuals who are not familiar with the Internet, a brief overview of relevant Internet concepts is presented here.

Figure 2:
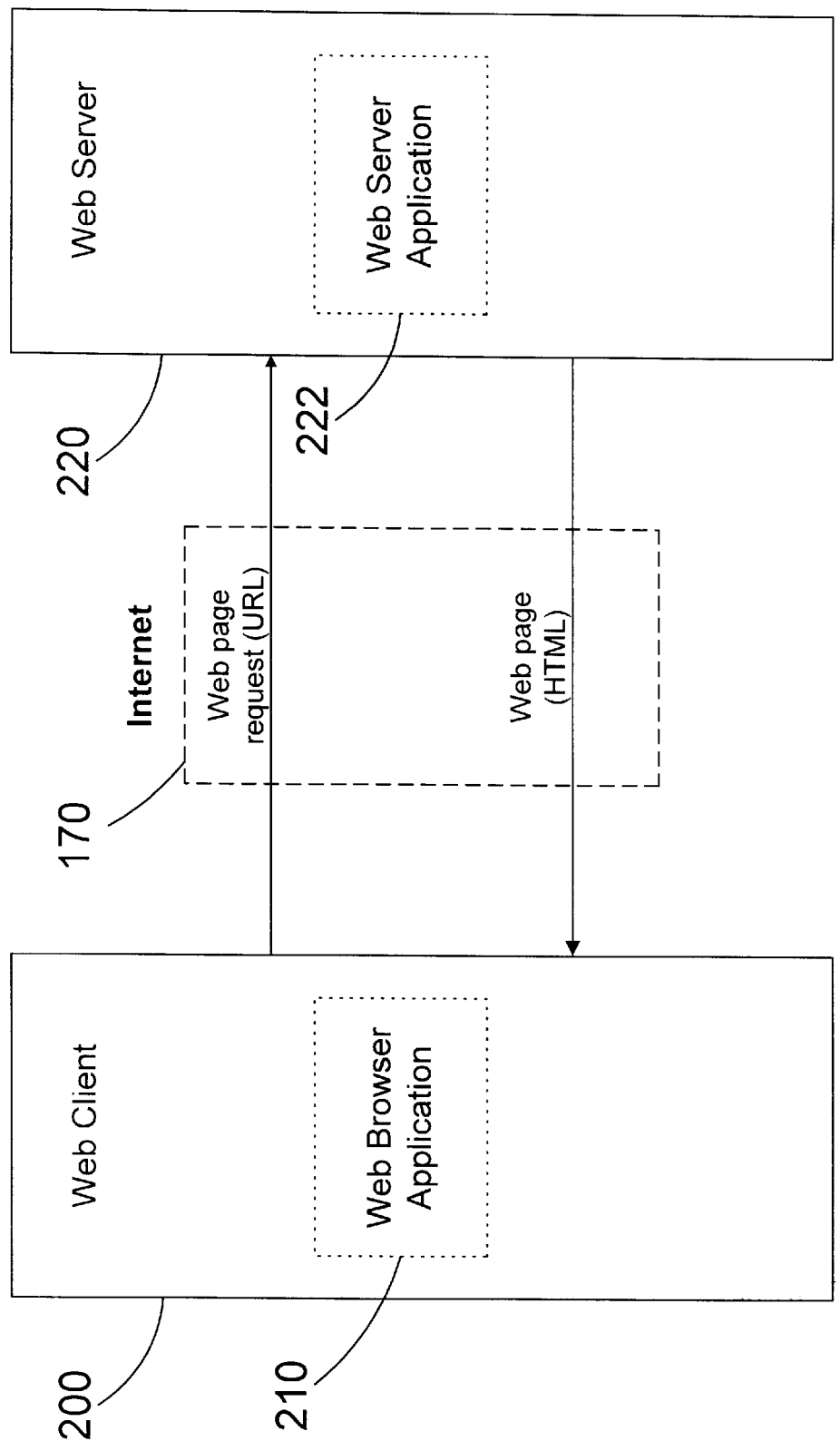
FIG. 2 is a block diagram of a typical Internet connection.

An example of a typical Internet connection is shown in FIG. 2. A user that wishes to access information on the Internet 170 typically has a computer workstation 200 that executes an application program known as a web browser 210. Under the control of web browser 210, workstation 200 sends a request for a web page over the Internet. Web page data can be in the form of text, graphics and other forms of information. Each web server on the Internet has a known address which the user must supply to the web browser in order to connect to the appropriate web server. Because web server 220 can contain more than one web page, the user will also specify in the address which particular web page he wants to view on web server 220. A web server computer system 220 executes a web server application 222, monitors requests, and services requests for which it has responsibility. When a request specifies web server 220, web server application 222 generally accesses a web page corresponding to the specific request, and transmits the page to the user's workstation 200.

Web Pages

A web page is primarily visual data that is intended to be displayed on the monitor of user workstation 200. Web pages are generally written in Hypertext Markup Language (HTML). When web server 220 receives a web page request, it will build a web page in HTML and send it off across the Internet 170 to the requesting web browser 210. Web browser 210 understands HTML and interprets it and outputs the web page to the monitor of user workstation 200. This web page displayed on the user's screen may contain text, graphics, and links (which reference addresses of other web pages.) These other web pages (i.e., those represented by links) may be on the same or on different web servers. The user can go to these other web pages by clicking on these links using a mouse or other pointing device. This entire system of web pages with links to other web pages on other servers across the world is known as the "World Wide Web".

The remainder of this specification describes how the present invention improves the convenience of printing related web pages by providing ways that a user may print related web pages without the customary user interaction required to invoke and print each web page. Those skilled in the art will appreciate that the present invention applies equally to the printing of any related data, whether the data be in the form of web pages, database records, or other data that may be interrelated.

DETAILED DESCRIPTION

Figure 1:
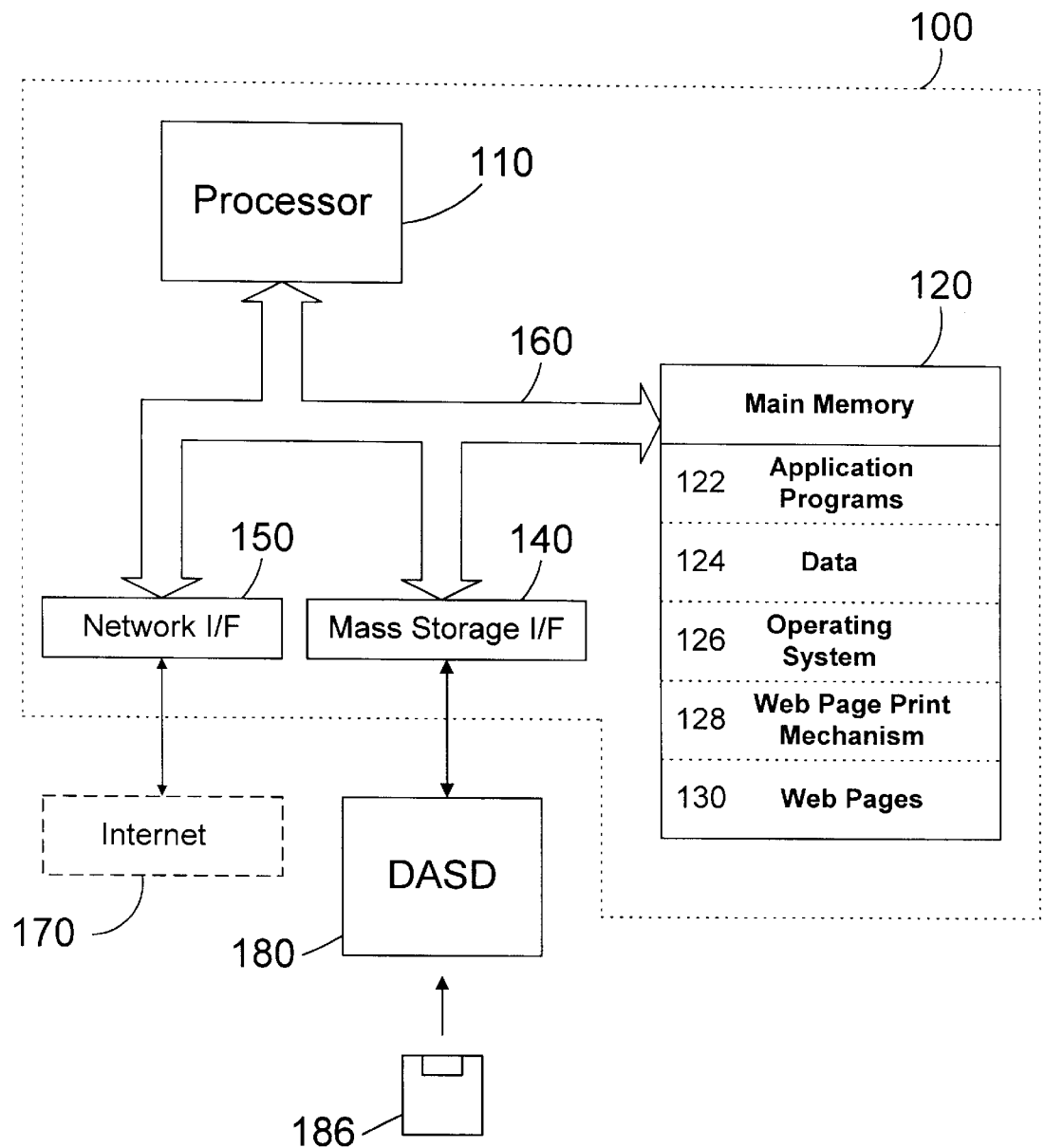
FIG. 1 is a block diagram of a computer system in accordance with the present invention.

Referring to FIG. 1, a computer system 100 in accordance with the present invention includes a processor 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of possible additions include: a computer monitor, a keyboard, a cache memory, and peripheral devices such as printers.

Processor 110 can be constructed from one or more microprocessors and/or integrated circuits. Processor 110 executes program instructions stored in main memory 120. Main memory 120 stores programs and data that the computer may access. When computer system 100 starts up, processor 110 initially executes the program instructions that make up operating system 126. Operating system 126 is a sophisticated program that manages the resources of the computer system 100. Some of these resources are the processor 110, main memory 120, mass storage interface 140, network interface 150, and system bus 160.

Figure 3:
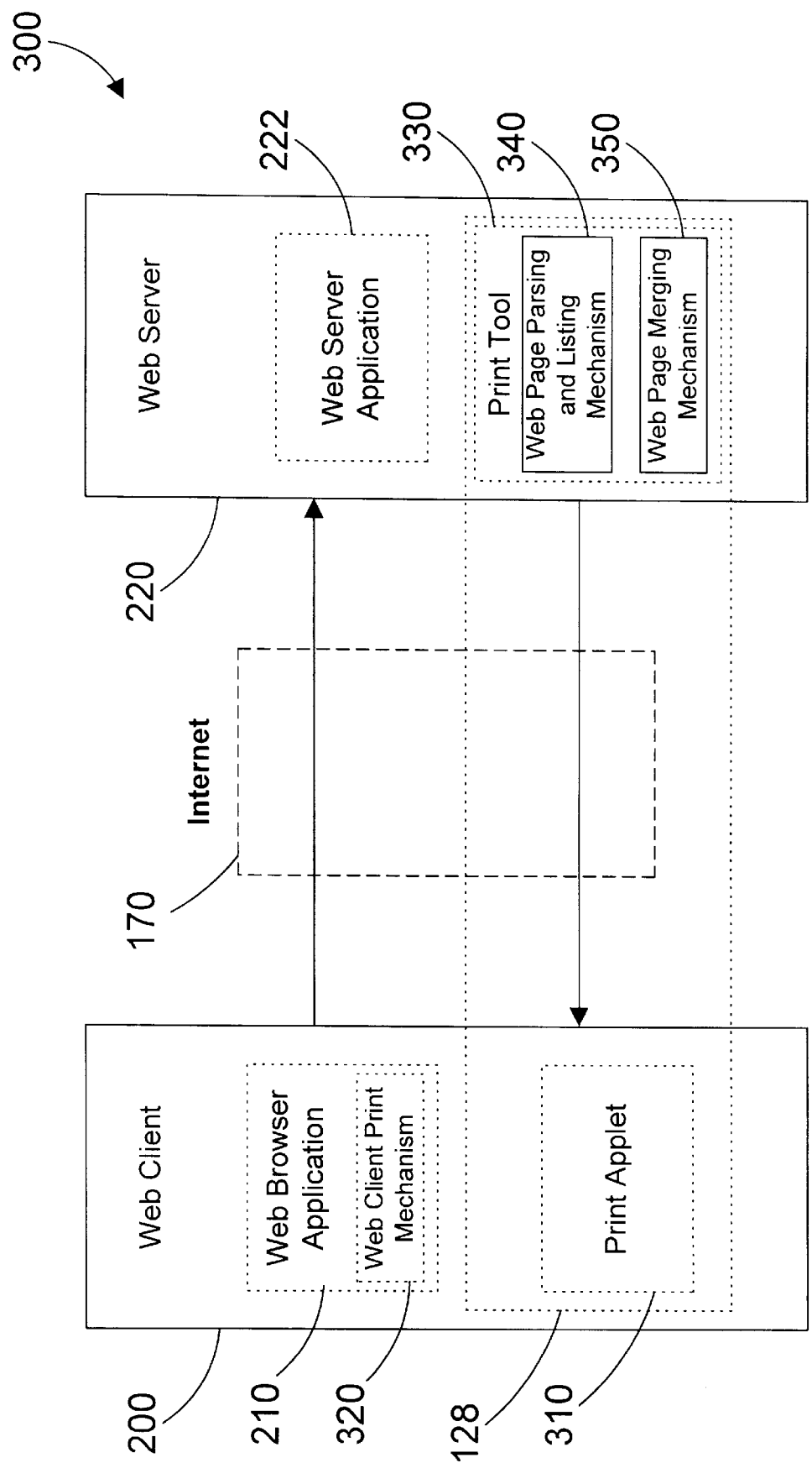
FIG. 3 is a block diagram of a computer system that allows printing of related web pages in accordance with the first embodiment.
Figure 5:
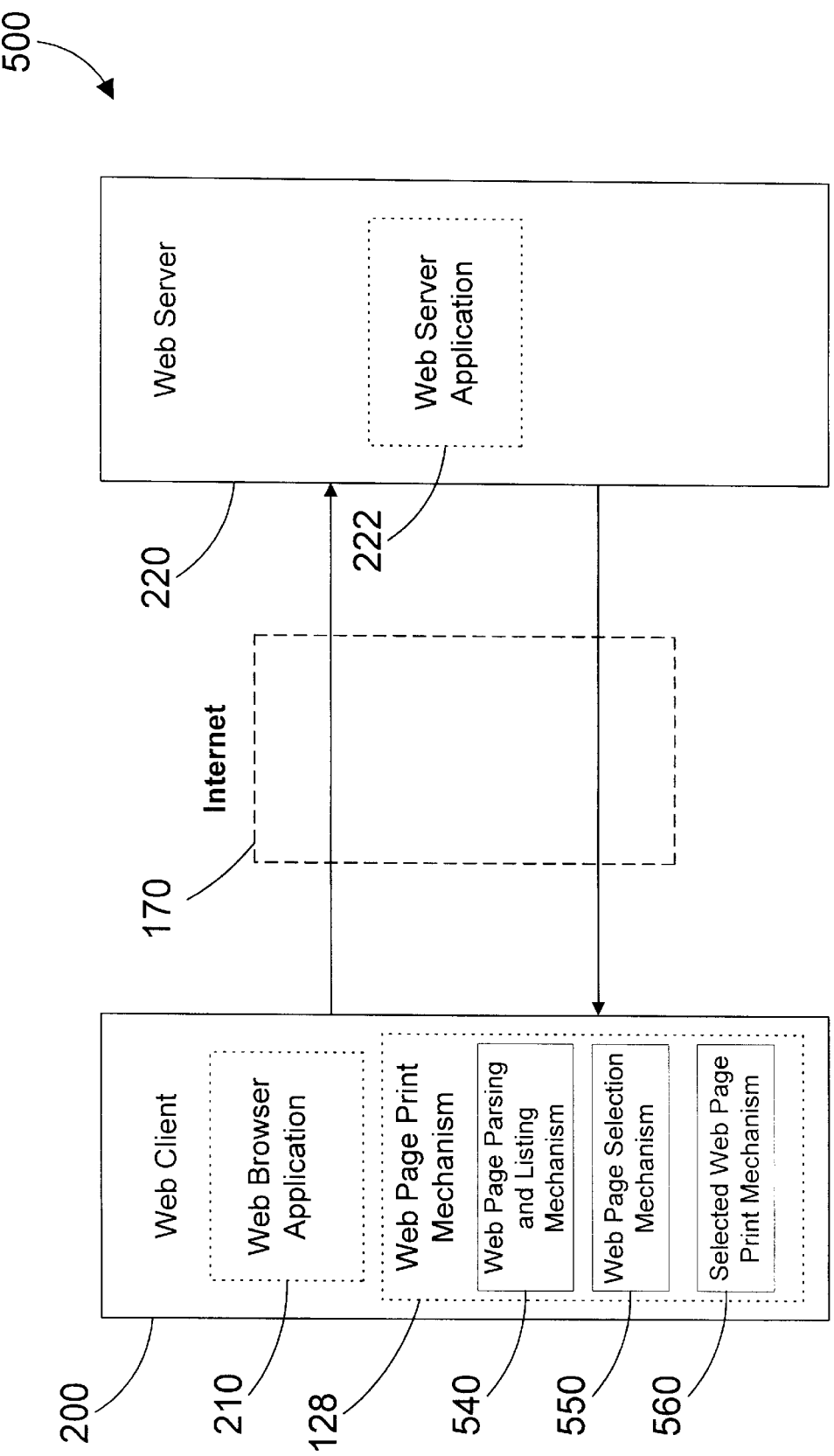
FIG. 5 is a block diagram of a computer system that allows printing of related web pages in accordance with the second embodiment.

Main memory 120 includes one or more application programs 122, data 124, operating system 126, a web page print mechanism 128, and one or more web pages 130. Application programs 122 are executed by processor 110 under the control of operating system 126. Application programs 122 can be run with program data 124 as input. Application programs 122 can also output their results as program data 124 in main memory. In the present invention, a computer system 100 includes a web page print mechanism 128 that allows multiple related web pages to be printed without manually printing each web page. The web page print mechanism 128 of FIG. 1 may exist on a single computer system, as shown in FIG. 5, or may be distributed among multiple computer systems, as shown in FIG. 3.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is usually placed in main memory 120 where processor 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 185). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. In addition, an apparatus in accordance with the present invention includes any possible configuration of hardware and software that contains the elements of the invention, whether the apparatus is a single computer system or is comprised of multiple computer systems operating in concert.

Network interface 150 allows computer system 100 to send and receive data to and from any network the computer system may be connected to. This network may be a local area network (LAN), a wide area network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 110, or may include I/O adapters to perform similar functions.

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 186 of FIG. 1) and CD ROM, and transmission type media such as digital and analog communications links.

Figure 4:
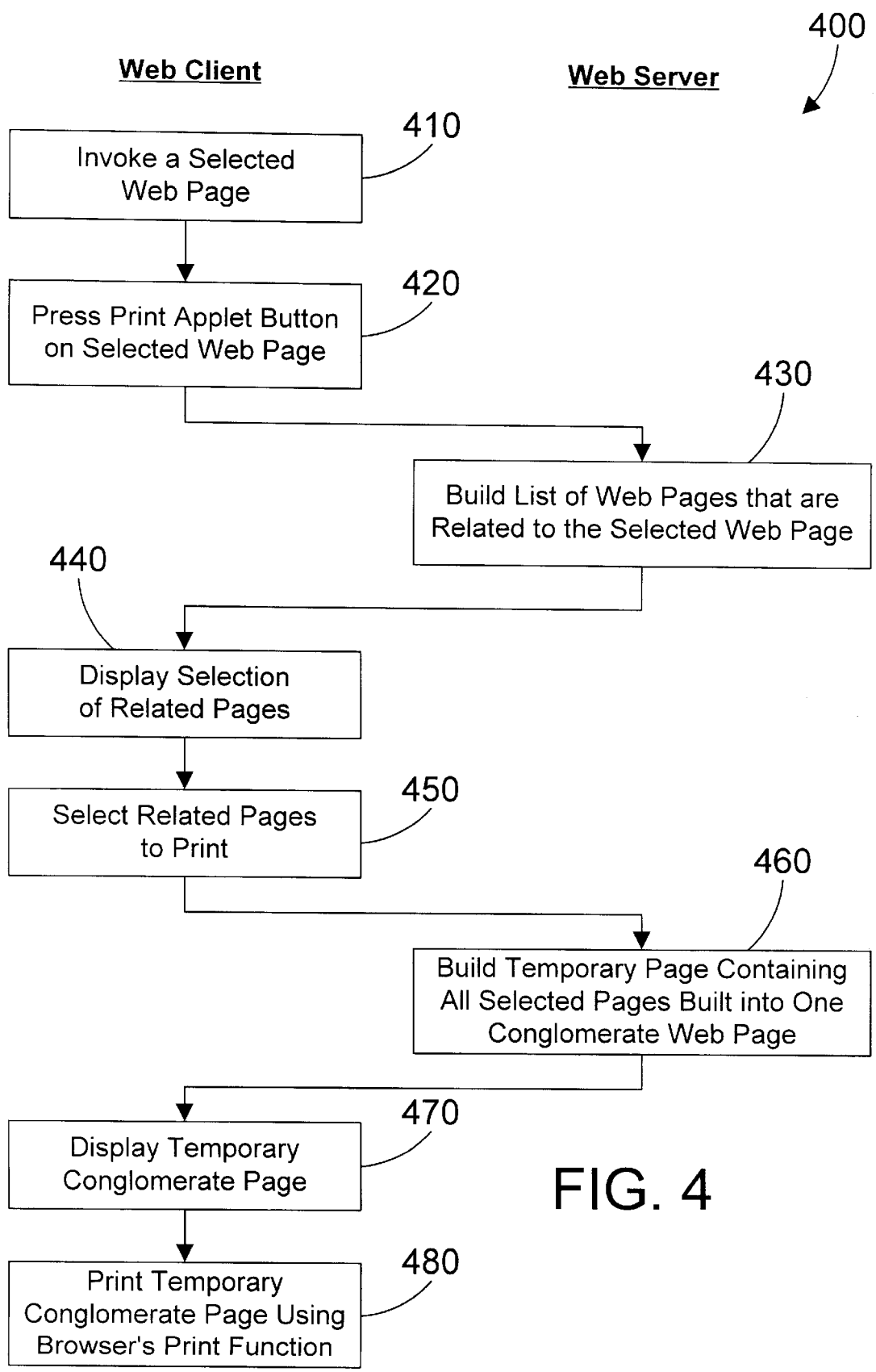
FIG. 4 is a flow diagram of the method steps for printing related web pages in accordance with the first embodiment.
Figure 6:
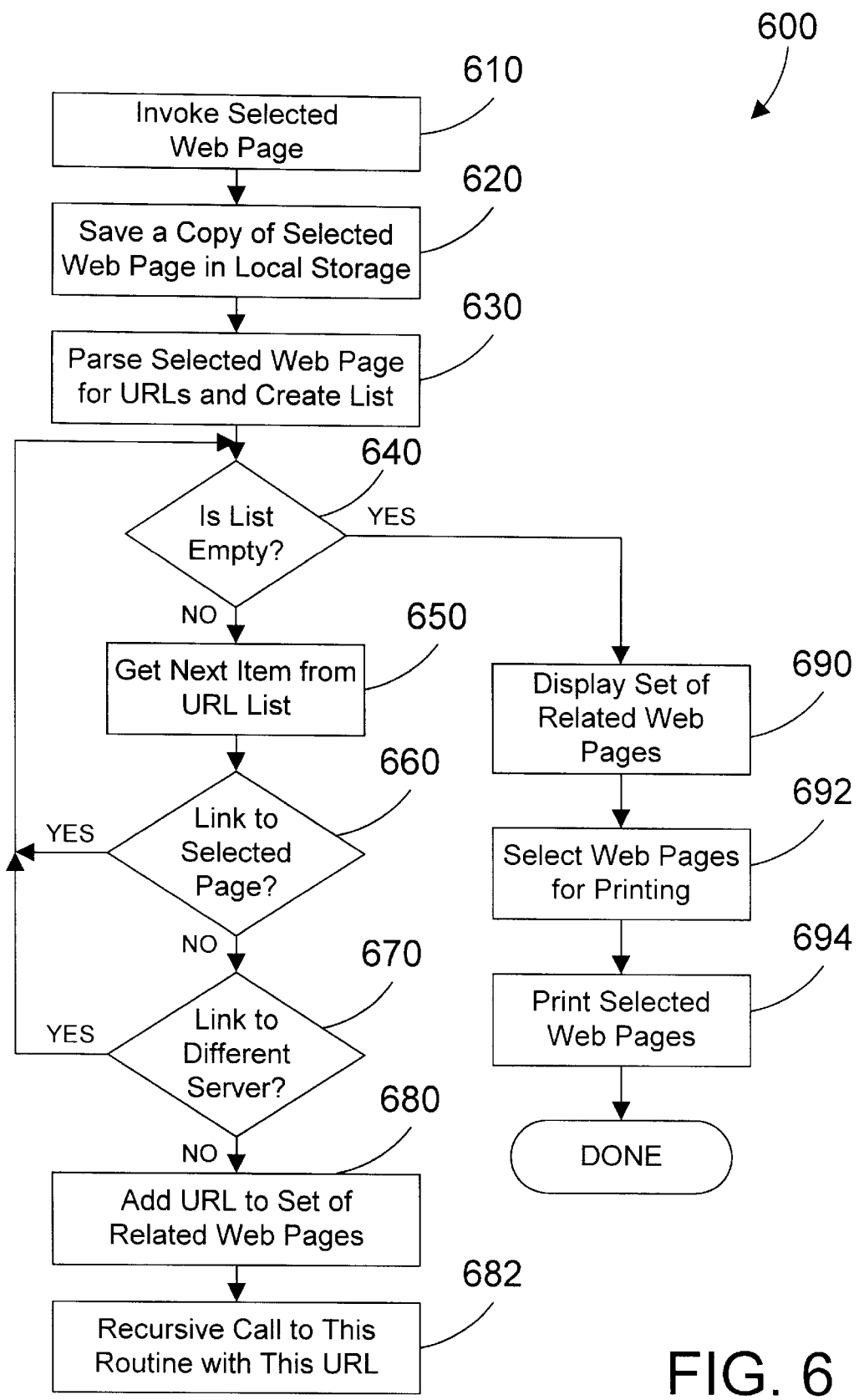
FIG. 6 is a flow diagram of the method steps for printing related web pages in accordance with the second embodiment.

The remainder of this specification will describe two different embodiments for printing related web pages. The first embodiment uses an applet on the web client in conjunction with a print tool that resides on the web server. An example of a suitable system and method in accordance with the first embodiment is shown in FIGS. 3 and 4. Any of the programs executing on a web server to accomplish the invention of the first embodiment are referred to generically herein as web server programs, and any of the programs executing on the web client are referred to generically herein as web client programs. The second embodiment of the present invention does not require any software to be installed on the web server. An example of a suitable system in accordance with the second embodiment is shown in FIGS. 5 and 6.

An apparatus 300 in accordance with the first embodiment is illustrated in FIG. 3, and includes a web client 200 coupled to a web server 220 via the Internet 170. Web client 200 includes a web browser application 210 and a print applet 310. The function of web browser application 210 is described above and is well-known in the art, and includes a web client print mechanism 320 that is used to print individual web pages. Print applet 310 is a small application such as a Java applet that is invoked when a user takes a particular action with respect to a selected web page. In the preferred embodiment, print applet 310 is executed when a user selects a particular "print button" on a web page that includes print applet 310. Print applet 310 is shown to reside on web client 200, but those skilled in the art will recognize that applets such as print applet 310 are typically dynamically loaded from web server 220 to web client 200 with a web page. A user presses the "print button" on a web page that corresponds to print applet 310 to indicate that printing of the current page and its related pages is desired.

Web server 220 includes a web server application 222 and a print tool program 330. Print tool 330 is a web server program that is used in conjunction with print applet 310 to print multiple related web pages. Print tool 330 includes a web page parsing and linking mechanism 340 and a web page merging mechanism 350. The function of mechanisms 340 and 350 may best be understood with reference to a method 400 in accordance with the first embodiment, which is illustrated in FIG. 4.

Method 400 starts by the web client 200 invoking a selected web page (step 410). A web page is typically invoked by the web client sending a Uniform Resource Locator (URL) to web server 220. The user can send a URL by "clicking" with a mouse on a web page link, or the user can enter the entire URL address manually in the web browser. The URL is sent and travels across the Internet 170, contacting the web server 220 that is specified in the URL. The web server then delivers the requested page specified by the URL to the web client. Note that the process of invoking a selected web page in step 410 involves web client/web server interaction, which is omitted from FIG. 4 for the sake of clarity. The mechanisms for invoking a web page using a URL are well-known and understood in the art.

Once the selected page is displayed on the web client, the user may press the print applet button on the web page (step 420) to cause the web page with its related web pages to be printed. Print applet 310 communicates with print tool 330 in web server 220, and in response, the web page parsing and listing mechanism 340 in print tool 330 builds a list of web pages that are related to the selected web page (step 430). Web page parsing and listing mechanism 340 builds the list by first parsing the selected web page and examining all links in the selected web page. Each of these links are analyzed to determine whether or not the link points to a web page that is related to the selected web page. The criteria for whether or not two web pages are "related" may vary within the scope of the invention. For example, one suitable criteria for relating web pages determines that web pages on the same web server are related, while pages on different web servers are not related. A preferred criteria for relating web pages determines that web pages that have the same base address as part of their URL are related, while pages with different base addresses are not. For example, a home page may have the address www.companyX.com/home.html, and any pages that have the base address www.companyX.com are related to the home page. In another example, a page at address www.companyX.com/support/index.html is selected, and any pages that share the base address www.companyX.com/support are related to the selected page, while other pages at this site are not related. Regardless of the specific criteria used, pages that are related to the selected web page are included in the list, and pages that are not related are not included in the list.

The list of related web pages is then passed to the web client, which displays the list to the user (step 440). The user then selects the pages on the list to print (step 450). The list of selected pages is then passed to the web server, which uses this information to build a temporary web page that is a conglomerate of all the pages that were selected for printing (step 460). The temporary conglomerate web page is built by the web page merging mechanism 350, which performs the necessary functions to convert several individual web pages into a single web page. For example, a tag <body> generally defines the beginning of an HTML page, and the tag </body> defines the end of an HTML page. For the case of printing HTML pages, web page merging mechanism 350 builds the conglomerate web page by removing the </body> tag in the first page to be printed, by removing the <body> tag in the last page to be printed, and by removing all <body> and </body> tags for all pages in between. In addition, other tags such as header and end tags may be moved to the beginning or end of the conglomerate web page, or may be deleted, if appropriate. This results in a single conglomerate web page that contains all the pages to be printed. This conglomerate web page is then passed to the web client and displayed to the user (step 470). The conglomerate web page may then be printed using the conventional print function that is supplied with the web browser application (step 480).

By providing a print applet that is downloaded to a web browser with a web page along with a print tool program running on then web server, a user may print multiple related pages with a standard web browser. This approach requires new software to be added to the web server. In the second embodiment of the invention, discussed in more detail below, no additional software is added to the web server. Instead, software is added to the web client to provide the capability of printing multiple related web pages.

Referring now to FIGS. 5 and 6, an apparatus 500 in accordance with the second embodiment includes a web client 200 and a web server 220 connected via the Internet 170. Web client 200 includes a web browser application 210 and a web page print mechanism 128. The web browser application 210 is a standard web browser known in the art.

Web page print mechanism 128 includes a web page parsing and listing mechanism 540, a web page selection mechanism 550, and a selected web page print mechanism 560. While web page print mechanism 128 is shown in FIG. 5 as being separate from web browser 210, in the best mode of the invention it is contemplated that web page print mechanism 128 will be integrated into a web browser application, thereby providing a browser with advanced web page printing capability. In the alternative, web page print mechanism 128 may be a separate application running on web client 200, or may be a plug-in or Java applet/application for web browser application 210. The functions of web page print mechanism 128 are described herein without regard to whether mechanism 128 resides within web browser application 210 or outside of web browser application 210.

Web page parsing and listing mechanism 540 is used to create a list of related web pages. Web page selection mechanism 550 interfaces with the web user to allow the user to select which of the related web pages in the list to print. Selected web page print mechanism 560 takes the web pages selected by the user in the list of related web pages and prints them. The function of these mechanisms may best be understood with relation to the flow diagram of FIG. 6.

A method 600 for printing multiple related web pages begins by invoking a selected web page (step 610). As discussed above with reference to the first embodiment, the mechanisms and interplay between web client and web server to invoke a web page are well-known in the art, and are not discussed here. Once the selected web page has been invoked, a copy of the selected web page is saved in local storage (step 620). Local storage may include any portion of memory within apparatus 500, including main memory, DASD, or other storage devices. The selected web page is then parsed by web page parsing and listing mechanism 540 for links to other web pages and a list of these links is created (step 630). Note that web page parsing and listing mechanism 540 performs steps 640–682 described below. The list is processed beginning with step 640. If the list is not empty (step 640=NO), the next URL in the list is selected (step 650). If the URL is a link to the selected page (step 660=YES) or is a link to a different server (step 670=YES), the URL is ignored and not added to the set of related web pages. If the URL is to a related page (e.g., on the same server for this example) (steps 660 and 670=NO), the URL is added to the set of related web pages (step 680), and method 600 is invoked recursively for that URL. In this manner method 600 traverses all related pages to build a complete set of pages to be printed. Note that many modifications to this approach are within the scope of the present invention. For example, a threshold may be selected by the user to determine the number of levels deep from the initial selected page method 600 will go in selecting related web pages. A threshold of two, for example, would limit the related pages to those that are one or two links away from the initial selected page. Other thresholds and criteria for determine what pages are related may be applied within the scope of the present invention. Regardless of the specific criteria for relating web pages, the present invention applies to all apparatus and methods for printing multiple related web pages.

Once all lists are empty for all URLs considered (step 640=YES), the list of related web pages is displayed to the web user (step 690). The web user then selects which of the related pages are to be printed (step 692), and these selected pages are then printed (step 694). Note that the print function is supplied by the selected web page print mechanism 560 (FIG. 5).

Figure 7:
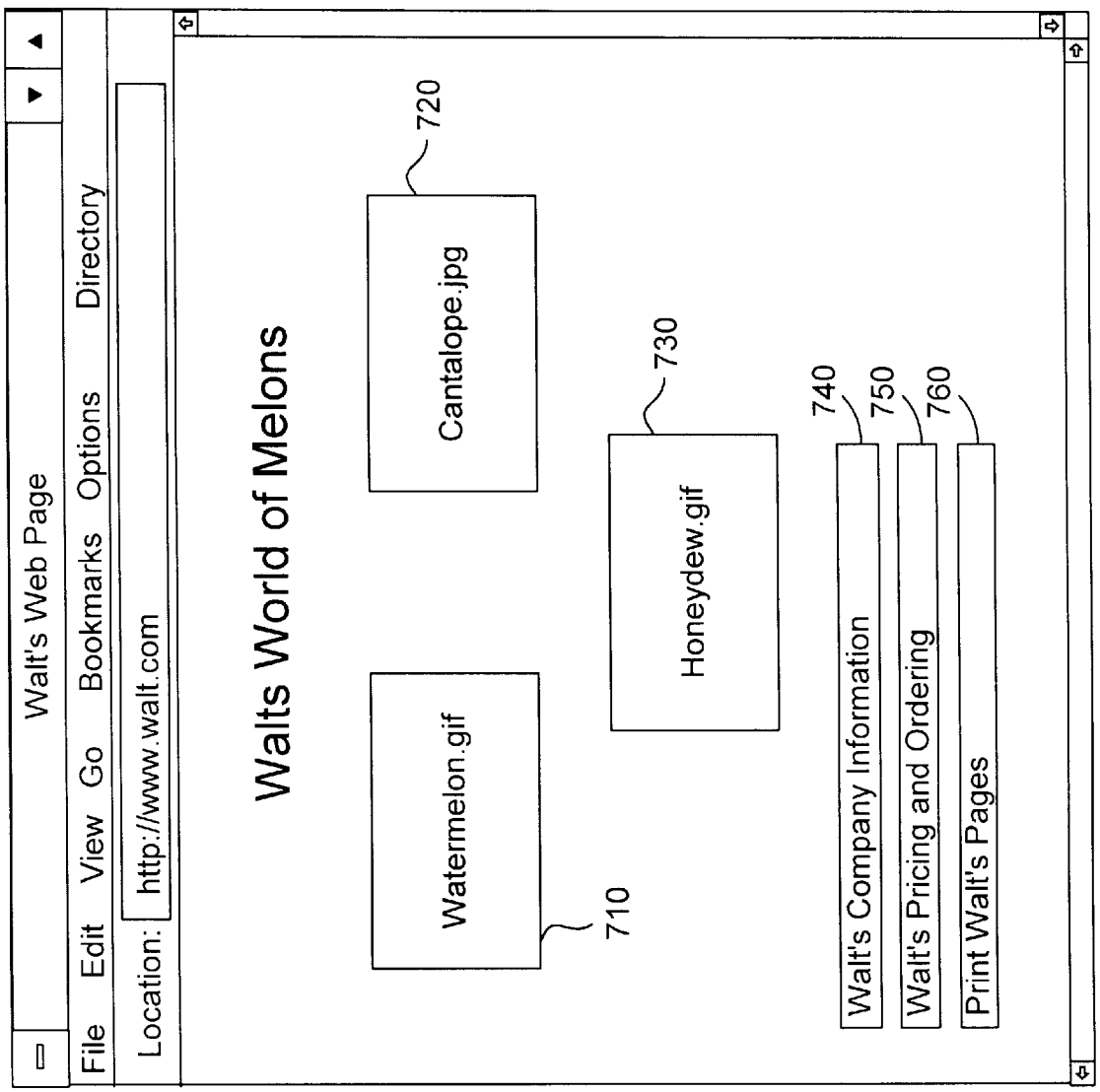
FIG. 7 is a sample web page.
Figure 8:
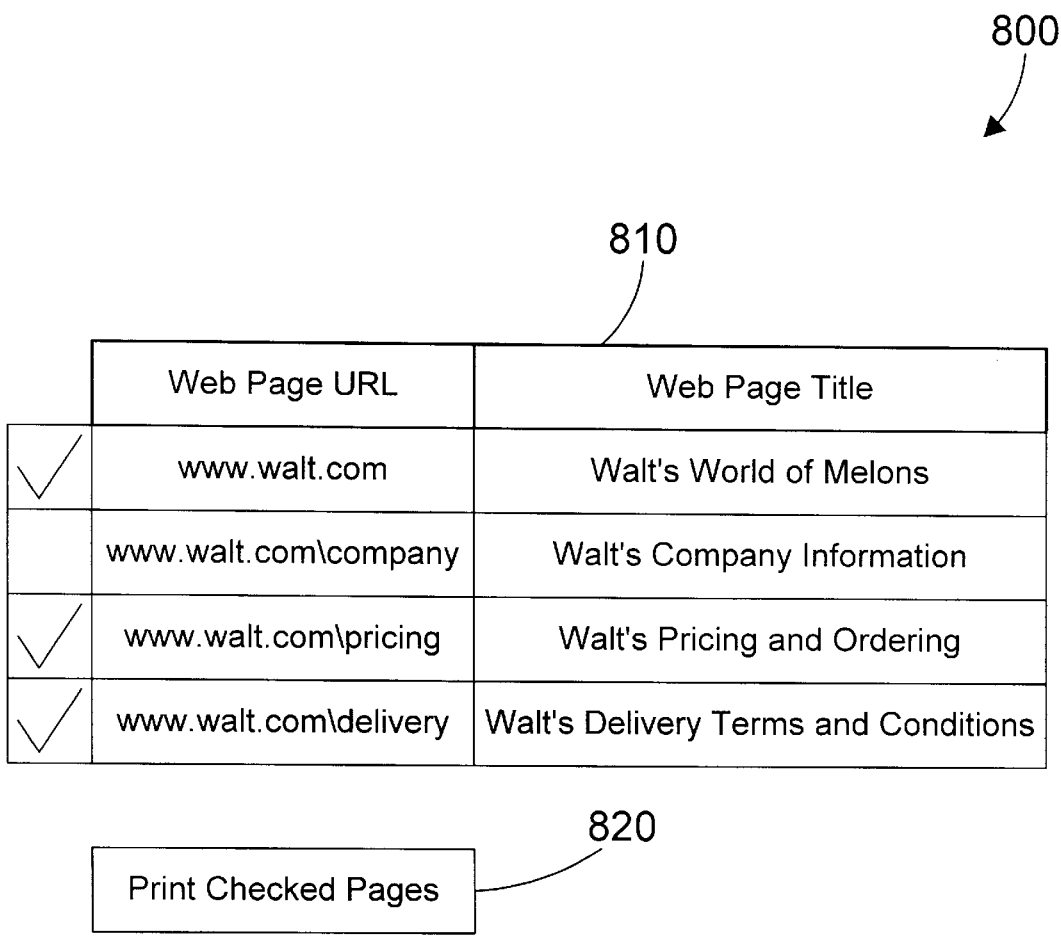
FIG. 8 is a sample display used to select web pages to be printed that relate to the web page of FIG. 7.

The function of the two embodiments disclosed herein may be best understood from a web user's viewpoint as shown in FIGS. 7 and 8. A sample web page 700 is shown that includes an image of a watermelon 710 and an image of a honeydew 730. Each of these two images is represented by a graphical interface (.GIF) file. Another image of a cantaloupe 720 is included in another graphical format known as JPG. In addition, two links 740 and 750 are provided to allow a user to go to these related web pages. An additional button 760 is provided, which corresponds to the button used to run print applet 310 in the preferred embodiment.

If web page 700 is the first page invoked by method 400 or method 600, the links in the page will be parsed and put in a list of related links. In this specific example, the two links 740 and 750 are related links, but any number of unrelated links may also be added on page 700. Unrelated links are ignored, so only related links are considered for this particular example.

We assume for the specific example of FIGS. 7 and 8 that the web page Walt's Company Information corresponding to link 740 has no links and that the web page Walts Pricing and Ordering corresponding to link 750 has one link to another related page entitled Walts Delivery Terms and Conditions. Thus, when all of the related links are parsed and a list of related links is built for this example, a display 800 results, which includes a list 810 of related links and a button 820 to print the selected web pages. Display 800 includes the URL of each web page, and the corresponding title. The web pages to be printed may be selected or deselected by the web user using any suitable method, but the method shown for illustrative purposes in FIG. 8 uses a checkbox next to each link. If the box is checked when the print checked pages button 820 is pressed, the corresponding page will be printed. If the box is not checked, it will not be printed. Thus, display 800 shows one possible way to display and select which related pages will be printed, which relates to steps 440 and 450 of method 400 and to steps 690 and 692 of method 600.

The specific embodiments disclosed herein have different advantages depending on the desired application. If a new web browser is being developed, the concepts of the second embodiment may be incorporated to provide printing of multiple related pages. If, on the other hand, a web site wants to incorporate the capability of printing multiple related pages for existing browsers, the concepts of the first embodiment may be used to generate a conglomerate web page that contains all selected related web pages, and the standard print function of the browser may then be used to print the conglomerate web page.

While the invention has been particularly shown and described with reference to preferred exemplary embodiments thereof, it will be understood by those skilled in the art that various changes in form and details may be made therein without departing from the spirit and scope of the invention. For example, while the preferred embodiments herein are discussed in terms of HTML pages, other page formats and data formats are equally encompassed by the present invention. The term page as used herein is intended to encompass any quantum of data that may be processed or displayed. In addition, while the invention is shown for exemplary purposes with regard to web clients and web servers that communicate over the Internet, the present invention applies to any type of client/server scenario on any suitable network.

What is claimed is:

1. An apparatus comprising:

at least one processor;

a memory coupled to the at least one processor;

a selected web page residing in the memory; and a web page print mechanism residing in the memory and executed by the at least one processor, the web page print mechanism comprising:

a web page parsing and listing mechanism that parses the selected web page and identifies a plurality of links on the selected web page that each reference a web page, and that generates from the identified links a list of web pages related to the selected web page;

a web page selection mechanism that allows a user to select for printing at least one web page from the list of web pages; and a mechanism for printing the at least one web page selected by the user using the web page selection mechanism.

2. The apparatus of claim 1 wherein the selected web page is selected using a Uniform Resource Locator (URL).

3. The apparatus of claim 1 wherein the selected web page is a hypertext markup language (HTML) page.

4. The apparatus of claim 1 wherein two web pages are related if the two web pages reside on the same server.

5. The apparatus of claim 1 wherein two web pages are related if the two web pages have the same base address.

6. The apparatus of claim 1 wherein the web page print mechanism merges the plurality of related web pages into a single web page.

7. The apparatus of claim 6 wherein the web page print mechanism further merges the selected web page into the single web page.

8. The apparatus of claim 1 wherein the web page print mechanism parses the selected web page and builds a list of the plurality of related web pages, displays the list to a user, allows the user to select at least one of the displayed related web pages, the web page print mechanism automatically generating a web page that contains all the user-selected web pages.

9. The apparatus of claim 1 wherein the web page print mechanism prints the plurality of related web pages without printing the selected web page.

10. The apparatus of claim 1 wherein the web page print mechanism prints the plurality of related web pages without displaying the plurality of related web pages to a user.

11. The apparatus of claim 1 wherein two pages are related if they satisfy at least one predetermined relation criterion.

12. A program product comprising:

(A) a web page print mechanism, the web page print mechanism including:

a web page parsing and listing mechanism that parses the selected web page and identifies a plurality of links on the selected web page that each reference a web page, and that generates from the identified links a list of web pages related to the selected web page;

a web page selection mechanism that allows a user to select from the list of web pages at least one web page to be printed;

(B) signal bearing media bearing the web page print mechanism.

13. The program product of claim 12 wherein two web pages are related if the two web pages reside on the same server.

14. The program product of claim 12 wherein two web pages are related if the two web pages have the same base address.

15. The program product of claim 12 wherein the signal bearing media comprises recordable media.

16. The program product of claim 12 wherein the signal bearing media comprises transmission media.

17. The program product of claim 12 wherein the web page print mechanism further comprises a mechanism for printing the at least one web page to be printed.

18. The program product of claim 17 wherein the selected web page is selected using a Uniform Resource Locator (URL).

19. The program product of claim 17 wherein the selected page is a hypertext markup language (HTML) page.

20. The program product of claim 12 wherein the a web page print mechanism merges the plurality of related web pages into a single web page.

21. The program product of claim 20 wherein the web page print mechanism further merges the selected web page into the single web page.

22. The program product of claim 12 wherein the web page print mechanism parses the selected web page and builds a list of the plurality of related web pages, displays the list to a user, allows the user to select at least one of the displayed related web pages, the web page print mechanism automatically generating a web page that contains all the user-selected web pages.

23. The program product of claim 12 wherein the web page print mechanism prints the plurality of related web pages without printing the selected web page.

24. The program product of claim 12 wherein the web page print mechanism prints the plurality of related web pages without displaying the plurality of related web pages to a user.

25. The program product of claim 12 wherein two web pages are related if they satisfy at least one predetermined relation criterion.

26. A computer-implemented method for printing a plurality of web pages, the method including the steps of:

selecting at least one web page containing at least one reference to at least one other web page;

parsing the at least one web page to locate the at least one reference;

determining whether the at least one other web page corresponding to the at least one reference is related to the selected web page;

generating at least one list of web pages related to the selected web page; and printing a plurality of the web pages in the at least one list.

27. The computer-implemented method of claim 26 further comprising the steps of:

displaying to a user the at least one list;

the user selecting from the at least one list which web pages to print;

wherein the step of printing the plurality of web pages comprises the step of printing the user-selected web pages.

28. The computer-implemented method of claim 26 wherein the step of selecting the at least one web page comprises the step of specifying at least one Uniform Resource Locator (URL).

29. The method of claim 26 further comprising the step of merging the plurality of related web pages into a single web page.

30. The method of claim 29 further comprising the step of merging the selected web page into the single web page.

31. The method of claim 26 wherein the step of printing the plurality of the web pages in the at least one list prints the web pages related to the selected web page without printing the selected web page.

32. The method of claim 26 wherein the plurality of web pages in the at least one list are printed without displaying the plurality of web pages to a user.

33. The method of claim 26 wherein two web pages are related if they satisfy at least one predetermined relation criterion.

34. A networked computer system comprising:
- a client computer system comprising at least one processor, memory coupled to the at least one processor, and a web browser residing in the memory and executed by the at least one processor, the web browser displaying a web page that contains a print applet, the print applet being executed when activated by a user;
- a web server computer system coupled via a network to the client computer system, the web server computer system comprising at least one processor, memory coupled to the at least one processor, and a print tool residing in the memory and executing on the at least one processor of the web server computer system, wherein the print applet on the client computer system initiates a print function by communicating a selected web page to the print tool, and in response the print tool parses the selected web page, builds a list of related web pages, displays the list to a user, allows the user to select at least one of the displayed related web pages, the print tool automatically generating a conglomerate web page that contains all the user-selected web pages and sending the conglomerate web page to the web browser.

35. A computer-implemented method for printing a plurality of web pages in a computer system that has a client computer system running a web browser coupled to a server computer system running a print tool, the method including the steps of:
- the user selecting a web page with the browser, the selected web page including a print applet;
- the browser displaying the selected web page to the user;
- the user executing the print applet in the selected web page, the print applet identifying the selected web page to the print tool;
- the print tool building a list of web pages that are related to the selected web page;
- the print tool sending the list of related web pages to the web browser, which displays the list to the user;
- the user selecting from the list of related web pages a plurality of pages to print, the web browser identifying the plurality of pages to print to the print tool;
- the print tool building a conglomerate web page that includes all of the plurality of pages to print; and
- the print tool sending the conglomerate web page to the web browser.

36. The method of claim 35 further comprising the step of a user printing the conglomerate web page using a print mechanism in the web browser.

* * * * *